Dec. 31, 1968
R. H. HAMMOND ET AL
3,419,718
APPARATUS FOR MEASURING THE FLOW OF
ELECTRICALLY NEUTRAL PARTICLES
Filed Dec. 15, 1965
Sheet 1 of 2
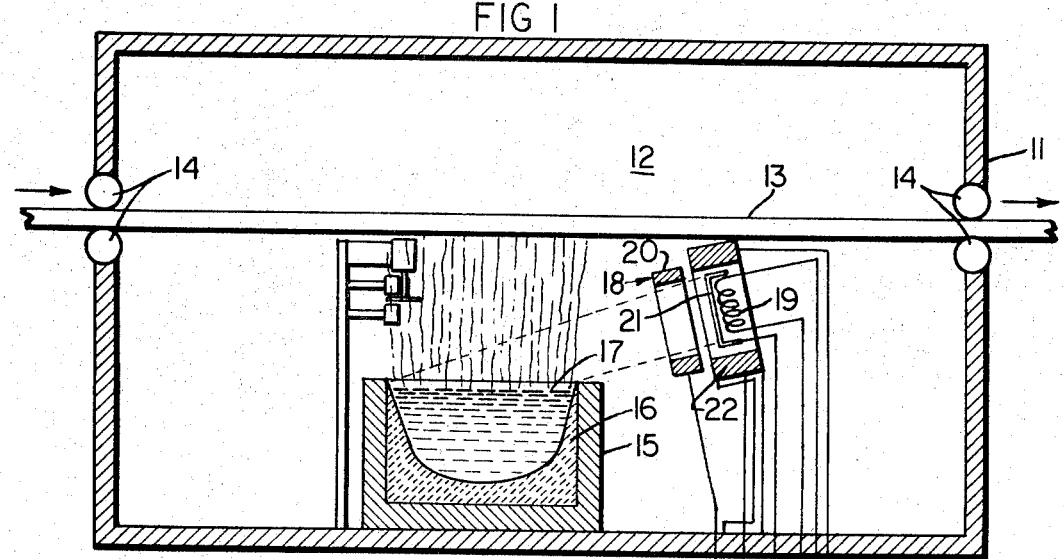
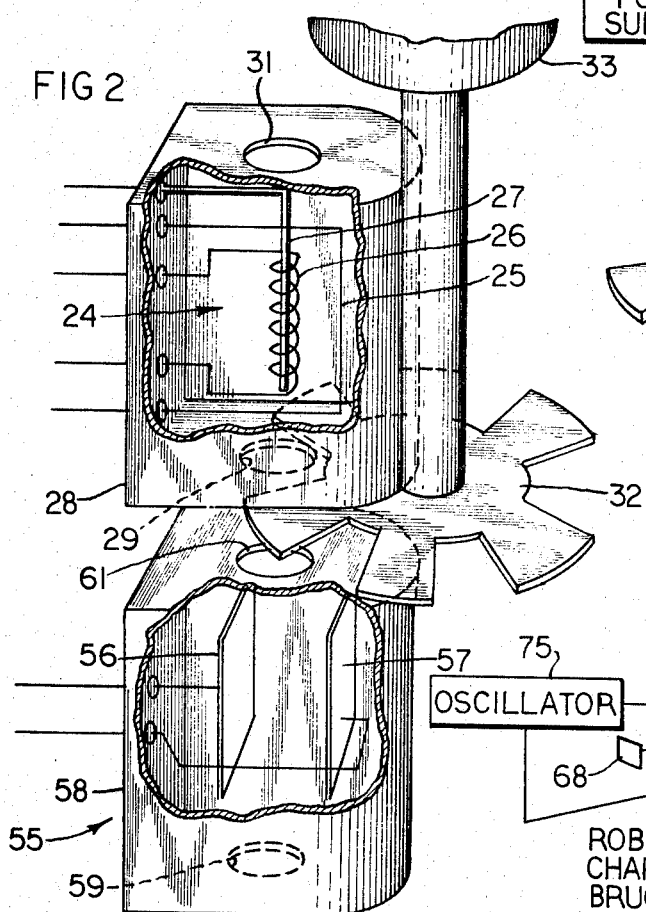
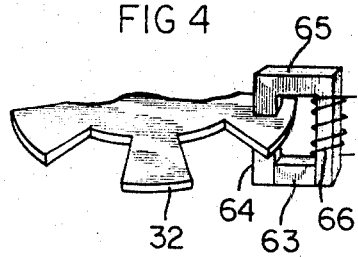
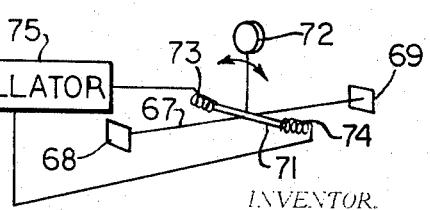
INVENTOR.
ROBERT H. HAMMOND
CHARLES H. MEYER JR
BRUCE L. GEHMAN
GUY M. KELLY
BY Anderson, Luedeka, Fitch, Even, & Tabin
ATTORNEYS

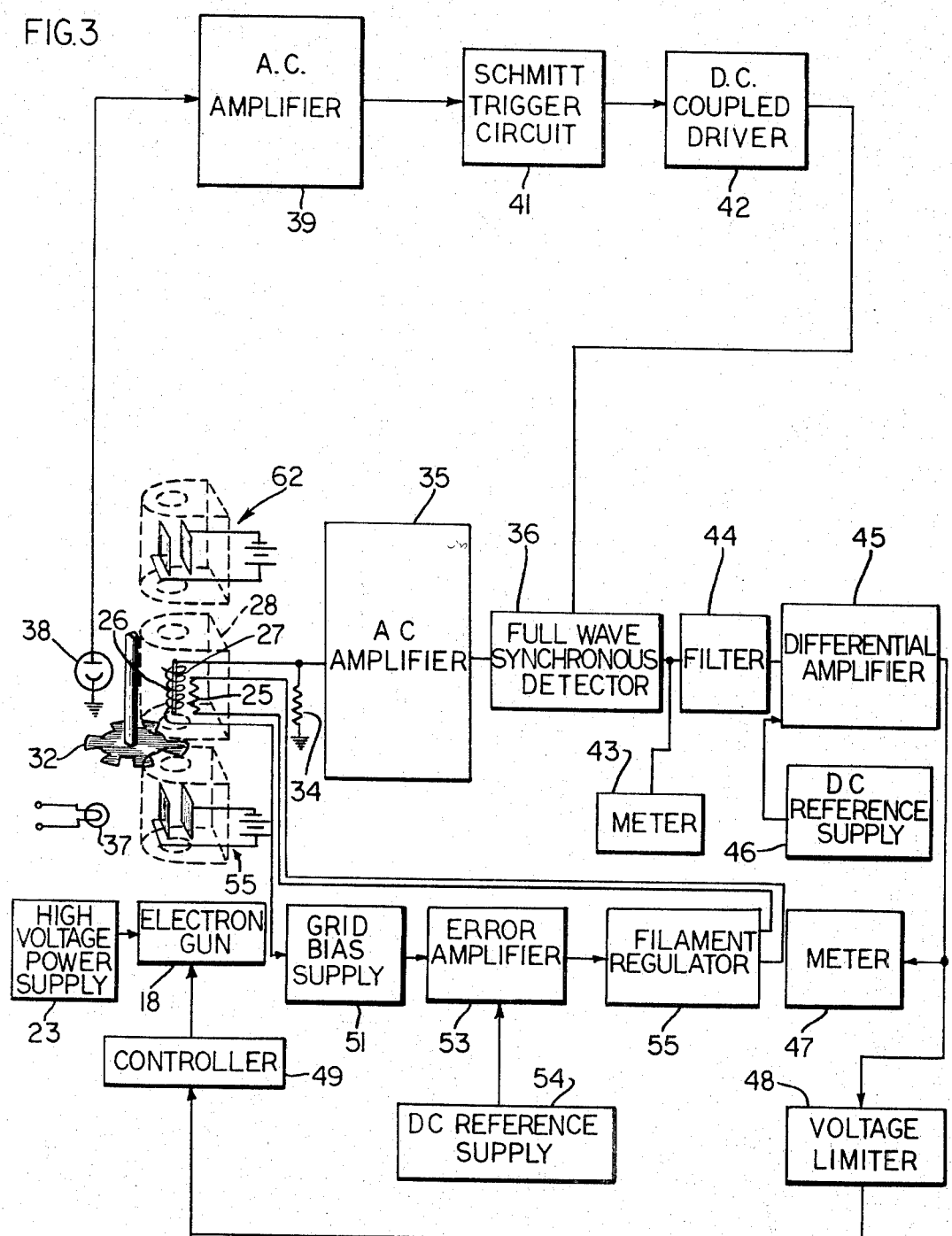

United States Patent Office 3,419,718
Patented Dec. 31, 1968

3,419,718
APPARATUS FOR MEASURING THE FLOW OF ELECTRICALLY NEUTRAL PARTICLES
Robert H. Hammond, San Diego, Charles H. Meyer, Jr., Del Mar, Bruce L. Gehman, San Diego, and Guy M. Kelly, La Jolla, Calif., assignors to Gulf General Atomic Incorporated, San Diego, Calif., a corporation of Delaware
Filed Dec. 15, 1965, Ser. No. 513,935
11 Claims. (Cl. 250—49.5)

ABSTRACT OF THE DISCLOSURE

Apparatus is disclosed for measuring the flow of a beam of electrically neutral particles in an evacuated environment. The apparatus has a sensing device positioned at a station in the path of a portion of the beam for sensing its flow. A shield is disposed about the sensing device to prevent particles other than those in the portion of the beam directed to the sensing device from reaching the same and to shield the sensing device from electromagnetic radiation which may be present in the environment. A stripper is disposed proximate to the portion of the beam prior to the beam reaching the sensing station to produce a field for deflecting charged particles, such as electrons, which may also be present in the environment, to prevent them from reaching the sensing device. Further means may be disposed proximate the portion of the beam for intermittently blocking this beam portion prior to its reaching the sensing device so that the response thereof indicative of the beam flow may be separated from any background response.

This invention relates to measuring apparatus and, more particularly, to apparatus for measuring the flow of a beam of electrically neutral particles of substantially constant velocity in an evacuated environment.

In the known technique of vapor deposition, a vapor source is utilized to produce a vapor of metallic or ceramic material or the like for providing a relatively thin coating of such material on a substrate. Such a vapor source may comprise a crucible in which vapors are produced from a molten charge and are expelled through an open end of the crucible due to molecular activity. This produces a beam of vapor which issues from the mouth of the crucible and strikes the surface of a substrate to condense and deposit a film on the substrate. The process is carried out in a high vacuum to produce a relatively high vaporization rate.

It is desirable in a system for vapor deposition to provide means for indicating the thickness of the accumulated deposit on the substrate. A convenient parameter from which the thickness of the deposit may be determined is the flow of the beam of vapor. Not only will the flow information provide an indication of the accumulated thickness of the deposit, but such information may be utilized in a feed back arrangement to automatically control the evaporation rate in the crucible to provide a smooth and uniform deposit.

A number of devices have been used for monitoring the flow of a vapor beam. Such devices include devices which measure the changing resistance of the deposited film, devices which measure the changing frequency of a quartz crystal due to its increasing mass as vapor condenses on the crystal, devices which measure the changing capacitance due to the vapor deposition of an insulator film, and devices which measure the eddy current damping of a coil on which the vapor condenses. Various mechanical techniques utilizing electronic read out may also be used for indicating the flow of the vapor beam.

One type of device for flow measurement which has found some success is a modification of the ion gauge commonly employed for pressure measurements. In this type of device, atoms of the evaporant traversing the gauge are ionized and the ion current is measured. Since the current is proportional to the number of atoms, the evaporation rate is indicated. The actual indication is the ratio of flow to particle velocity, but since the velocity is nearly constant over wide ranges of the vapor pressure of all materials, it is nearly correct to say that the gauge measures flow. Because the ion gauge has a wide dynamic range of rates, a fast response time, and is capable of being "baked" at very high temperatures, it has been successfully used in some applications.

Unfortunately, it has been found that ion gauge monitors are not satisfactory in some vapor deposition situations and have not been generally used in vapor deposition plants or systems of high deposition capability. A large number of charged particles are present throughout a vacuum chamber during the vapor deposition process, especially at high vaporization rates. These particles often become attracted to exposed electrodes of the ion gauge and cause spurious voltages. Such charged particles are comprised primarily of electrons, but include some ionized atoms of the vapor and of the residual gas in the evacuated chamber. In addition to the problem of ionized particles, a large amount of electromagnetic radiation, extending through nearly the entire frequency spectrum from DC to X-ray frequencies, is generated in many vapor deposition systems by high power electron guns and molten metal. This radiation often can induce voltages in the ion gauge. Other types of flow monitoring gauges or sensing elements may also be affected by these adverse conditions.

It is an object of this invention to provide improved apparatus for measuring the flow of a beam of electrically neutral particles of substantially constant velocity in an evacuated environment.

Another object of the invention is to provide apparatus for measuring the flow of a beam of electrically neutral particles, which apparatus is substantially unaffected by the presence of spurious charged particles.

Still another object of the invention is to provide apparatus for measuring the flow of a beam of electrically neutral particles, which apparatus is substantially unaffected by the presence of electromagnetic radiation.

In the drawings:

FIGURE 1 is a schematic full section view of a vacuum deposition system in which the invention is particularly useful;

FIGURE 2 is an enlarged perspective view, with parts broken away, of apparatus constructed in accordance with the invention;

FIGURE 3 is a schematic view of the apparatus of the invention including a particular form of electronic circuitry which may be utilized therein;

FIGURE 4 is a perspective view of a portion of the apparatus illustrating a modification thereof; and FIGURE 5 is a schematic view of an alternative form of a portion of the apparatus.

The invention comprises apparatus for measuring the flow of a beam of electrically neutral particles of substantially constant velocity in an evacuated environment. The apparatus includes a sensing device positioned at a station in the path of a portion of the beam for sensing the flow thereof. A shield is placed adjacent the sensing device for preventing particles other than those in the portion of the beam in which the sensing device is positioned from reaching the station, and for shielding the sensing device from electromagnetic radiation. An electronic circuit is connected to the sensing device and produces an indication of the flow of the beam sensed by the sensing device. A stripper is positioned to be disposed proximate the beam prior to contact thereof with the sensing device. The stripper produces a magnetic or electrostatic field which deflects charged particles to prevent such particles from reaching the sensing device. The electrically neutral particles in the beam, which represent the actual vapor beam, are not deflected and pass on to the sensing device. Although having particular application to the field of vapor deposition, the invention may be used to measure the flow of any beam of neutral particles and is of advantage where there are numerous charged particles and radiation present which detrimentally affect the sensing device.

Referring now more particularly to FIGURE 1, an application for which the invention is particularly useful is illustrated. A vacuum chamber housing 11 defines a vacuum chamber 12 which is evacuated, by suitable means not shown, to a high degree of vacuum. A substrate 13 to be coated is passed into the vacuum chamber 12 through vacuum seals 14 disposed in opposite walls of the vacuum chamber housing 11. Substrate 13 may be a continuously moving sheet as shown (effectively of infinite length), or may be an object of finite dimensions placed in vacuum chamber 12 and then removed therefrom subsequent to the completion of the vapor deposition process.

The beam of vapor, which is directed at the surface of substrate 13 for condensation thereon, is produced in a crucible 15. Crucible 15 includes a refractory liner 16 in which is disposed a pool of molten material 17. The molten material may be any material which is subject to vaporization at high temperatures, but the vapor deposition process has particular application for those metals and ceramic materials which have particularly high melting points and are extremely difficult to machine by conventional processes. The molten material 17 may be replenished as it evaporates by a suitable feeding system, not illustrated.

Molten material 17 is melted and evaporated by means of an electron gun 18. If the requirements so warrant, a plurality of electron guns may be arrayed in vacuum chamber 12. Electron guns for producing high power electron beams for melting, evaporating, welding, or machining are known in the art. The use of electron beam heating is described in an article beginning on page 80 of "International Science and Technology," April 1962 and written by R. F. Bunshah. Electron gun 18 includes a filament 19 for heating a cathode 21 to emit electrons into the evacuated vacuum chamber 12. The electrons produced by cathode 21 are drawn off by anode 20 and are directed in a beam by a strong electromagnet 22 into the crucible 15 for melting and evaporating the molten material 17 therein. Power is supplied to the filament, cathode and electromagnet of electron gun 18 by means of a suitable power supply 23.

As set out above, a number of devices have been tried for monitoring the flow of a vapor beam, both as a means of indicating the rate of deposition of the beam on a substrate and hence the accumulated thickness of the deposit, and as a means for automatically controlling the flow of the beam by a feed-back arrangement to an electron gun. Among these devices is a modification of the ion guage commonly employed for pressure measurements and such a gauge is described herein in connection with the invention. It is to be understood, however, that other means or types of sensing devices in addition to the ion gauge shown, may be utilized in connection with the invention. The ion gauge or sensing element comprises a filament 25, a grid 26 and a collector 27. The gauge is positioned in the beam of evaporated atoms or particles issuing from the molten material 17 in the crucible 15 such that a portion of the beam traverses the gauge. Atoms of the evaporant traversing the gauge are ionized by the electrons emitted by the grid 26 and a current flows from collector 27. The magnitude of this current is proportional to the ratio of the flow of the beam to the velocity of the particles in the beam. The velocity of such particles is nearly constant over wide ranges of the vapor pressure for all materials, and it is therefore a satisfactory approximation of the flow to say that such flow is proportional to the ion current.

Despite the fact that vacuum chamber 12 is evacuated to a high degree of vacuum, in a situation where high evaporation rates are produced by very strong electron beams, a large number of charged particles are present throughout the vacuum chamber. These charged particles are attracted to the exposed electrodes of the ion gauge to impinge thereon and cause spurious signals. Such charged particles are primarily electrons with some ionized atoms of the vapor and of the background gas. In addition, the high energies present in the electron gun and in the crucible 15 may produce a large amount of electromagnetic radiation extending from direct current up through radio frequency to X-ray frequency. This radiation often can induce voltages on the collector of the ion gauge by emission of photo-electrons therefrom.

In order to protect the ion gauge from charged particles and electromagnetic radiation, the ion gauge 24 is enclosed in a gauge housing or shield 28. Housing 28 includes an entry opening 29 and an exit opening 31 which are aligned with each other and are disposed in opposite walls of the gauge housing 28. These holes or openings are the only access to the gauge for particles and radiation and act to collimate the portion of the vapor beam traversing the gauge. The radiation effect is minimized by making the holes relatively small and by not permitting the collector to see the X-ray or ultraviolet rays emitted by the vaporizing apparatus in order to prevent photo emission. As shown in FIGURE 2, the shield 28 is electrically isolated from the sensing element therein by means of suitable insulating beads or bushings through which the leads of the sensing device pass.

Despite the shielding provided by gauge housing 28, a certain minimal amount of particles will enter the housing through the openings and traverse the ion gauge 24, even in the absence of a beam of vapor issuing from the crucible 15. In order to eliminate the effect of this background of ionized particles from the flow of the beam sensed by the ion gauge 24, a vaned wheel or chopper 32 is mounted at the outside of entry opening 29. Vaned wheel 32 is rotated by a motor 33 which is constructed to withstand the high temperatures of the vacuum chamber 12. As motor 33 is rotated, vaned wheel 32 interrupts or chops the beam passing through entry opening 29, and thereby produces an AC signal representing the beam flow which is superimposed on the direct current signal resulting from the background of ionized particles traversing the ion gauge 24.

The superimposed alternating current is then detected by a suitable electronic circuit. The circuit may include means for metering the magnitude of the alternating current to thereby provide an indication of the beam flow, The AC signal may also be compared to a desired level and an error signal derived and sent back through a system for controlling the beam rate by controlling the intensity of the electron beam.

One electronic arrangement for providing the desired indication and control is illustrated schematically in FIGURE 3. The AC output of ion gauge 24 is derived across a suitable load resistor 34 and is fed into an AC amplifier 35. Amplifier 35 may be a high stability audio frequency AC amplifier or, alternatively, may be an AC coupled electrometer circuit. The output of amplifier 35 is then applied to a full wave synchronous detector 36.

A gating signal for the synchronous detector 36 is obtained by means of a bulb 37 and a photo-cell 38. Alternatively, a photo-diode and ultraviolet lamp or similar devices, could be used. The light emitted by bulb 37 is interrupted by the rotation of the vaned wheel 32 in synchronism with the interruption of the vapor beam passing through the entry opening 29. The pulses thus produced are amplified in AC amplifier 39, are shaped into square wave pulses in a Schmitt trigger circuit 41, and are applied to the full wave synchronous detector 36 through a DC coupled driver 42. These gating pulses thereby synchronize the full wave synchronous detector 36 with the operation of the vaned wheel 32. The rectified AC output of synchronous detector 36 may be metered by a meter 43 and thereby provide an indication of the flow of the vapor beam issuing from the crucible 15.

A gating signal for the synchrouous detector 36 may, alternatively, be derived from apparatus as shown in FIGURE 4. The vaned wheel 32 is made of magnetic material and the vanes interrupt the flux path of a small permanent magnet 63 having suitable pole pieces 64 and 65 extending therefrom and forming a gap through which the vanes pass. The inductance of this magnet is changed with each interruption of the vaned wheel as the teeth thereof pass through the gap between the pole pieces. Each interruption causes a rapidly changing inductance to produce a reference signal in the coil 66 surrounding one leg of the pole piece 65. This reference signal may then be used in the same manner as the signal derived from the photo-cell arrangement illustrated in FIGURE 3.

Under some circumstances, it may be preferable to use some form of vibrator rather than a rotating vaned wheel type chopper as described above. Such an alternative configuration is shown in FIGURE 5. An elongated wire 67 extends between a pair of fixed supports 68 and 69. A rod 71 is fixed to the wire and extends transversely thereof. The rod has a flag or shutter 72 extending therefrom positioned to interrupt the vapor beam prior to its entry into the ion gauge housing. The rod is free to rotate about the axis of the wire due to torsional flexure of the wire, and the moment of inertia of the rod and flag combine with the restoring torque of the wire to form a mechanically resonant system. The system is driven by an AC magnetic field produced by a pair of coils 73 and 74, each acting on a respective end of the magnetic rod. An AC signal is fed to the coils from an oscillator 75 and is at the resonant frequency of the mechanical system and must track that frequency as it changes, such that the mechanical system is always the frequency determining element of the oscillator which drives it.

Alternatively to driving such a system at its natural mechanical resonance, it is possible to drive the system with a fixed frequency oscillator off resonance. Naturally, such a system would require a substantially higher level of driving voltage than would a resonant system. A vibrating chopper, such as described above, may provide advantages over a motor driven chopper wheel in that it is more easily designed to be bakeable at high temperatures, and in that no reference signal for the synchronous detector need be generated in the vacuum chamber. Instead, the reference signal may be derived directly from the driving oscillator.

A feed back circuit for controlling the operation of the electron gun 18 also utilizes the output of the synchronous detector 36. The output is passed through a filter 44, which may be a simple resistance-capitance time constant network, to smooth out the rectified AC output of synchronous detector 36. After leaving filter 44, the signals are applied to a differential amplifier 45 and compared to signals from a direct current reference supply source 46. The signals from reference supply 46 represent the level of a desired flow of the beam. Differential amplifier 45 compares the two signals and porvides an output represestative of the difference between the two. This output represents the error signal and may be metered by a suitable meter 47 to indicate the difference between the actual beam flow and the desired flow of the vapor beam. Such error signal is passed through a voltage limiter 48, which may be comprised of adjustable diode clippers, to limit the magnitude of the voltage and avoid excessive peaks which might drive the control circuitry too hard. The error signal is then applied to a controller 49 for controlling the magnitude of current supplied to the electron gun 18 from the power supply 23 thereof. The control circuit or controller 49 may be any conventional servo system to reduce the error signal by controlling the electron gun 18 such that a desired level of vapor beam flow is attained.

The filament current for the ion gauge 24 may be regulated by circuitry which includes a grid bias supply 51 connected to the emitter electrode 26 of the ion gauge 24. The grid bias supply is coupled to an error amplifier 53 which compares the supply voltage 51 with a reference voltage applied to the error amplifier 53 from a DC reference supply 54. The difference between the two, or the error, is applied to a filament regulator circuit 55 which may comprise any suitable circuitry for regulating the filament current in accordance with an error signal applied thereto.

Other modifications of the circuitry shown in FIGURE 3 might be possible. For example, a further ion gauge could be added in the system for reading the backkground pressure or ionization current of the system when the vapor beam is not issuing from crucible 15. A further collector electrode could be added to the ion gauge 24, positioned outside the emitter, so that only the background gas is sensed, even while a beam is passing through the center of the ion gauge. This would allow monitoring the level of background gas during the operation of the system. A meter circuit could be provided for integrating the output of the synchronous detector to thus provide an indication of the actual thickness of the deposited film. Such an integrated signal could also be used to operate shutters or to turn off the electron gun when a predetermined thickness is reached.

To prevent charged particles from passing through the entry opening 29 and into the ion gauge 24, a stripper 55 is placed adjacent the entry opening 29. Stripper 55 includes a pair of oppositely disposed plates comprising an anode plate 56 and a cathode plate 57. A potential is applied between the plates to produce an electrostatic field through which the beam passes. Anode plate 56 and cathode plate 57 are enclosed in a stripper housing 58 having an entry opening 59 and an exit opening 61 aligned with each other in opposite walls of stripper housing 58. Openings 59 and 61 are aligned with openings 29 and 31 in gauge housing 28 and operate to collimate a portion of the vapor beam issuing forth from the crucible 15. This collimated portion of the beam passes between the anode plate 56 and cathode plate 58 and traverses the ion gauge 24. Because of the electrostatic field produced by plates 56 and 57, any charged particles present in the collimated portion of the beam will be deflected by the field and will strike the inner side of the stripper housing or the outer side of the gauge housing, depending upon the amount they are deflected. Thus only the neutral particles in the beam representing those particles which are emanated from the crucible 15 traverse the ion gauge 24. Charged particles present in the system are eliminated by the stripper. A further stripper 62 (see FIGURE 3), identical to stripper 55, may be placed adjacent the exit opening 31 of gauge housing 28 to prevent charged particles (usually electrons) from leaking into the gauge housing 28 through the exit opening 31 therein.

The voltages applied between the anode plate 56 and cathode plate 57 are selected in accordance with the size and operating characteristics of the electron gun 18, and in consideration of the material being evaporated. In order to experimentally test for sufficient stripping of the charged particles from the neutral collimated portion of the beam, the ion gauge filament is turned off and the voltage on the stripper varied until the collector current is zero with the beam passing through the ion gauge.

In general, there could still be a collector current if there occurred ejection of electrons from the walls of the gauge housing 28 by intense photo emission from the molten material or electron gun, or photo ionization of background gas from the same sources, or impact ionization of background gas by atoms in the beam. Under most conditions, these latter three difficulties should be negligible. In the drawing, the collector is shown in the center of the ion gauge as is the collimated portion of the vapor beam. In practice, the collimated portion of the vapor beam and the collector would be offset to prevent photoemission at the collector and a deposit from building up on the collector.

It may therefore be seen that the inevntion provides improved apparatus for measuring the rate of flow of a beam of electrically neutral particles of substantially constant velocity in an evacuated environment. The apparatus is substantially unaffected by the presence of charged particles in the evacuated chamber, and further, is substantially unaffected by the presence of electromagnetic radiation. Various modifications of the invention will be apparent to those skilled in the art and such are intended to fall within the scope of the appendant claims.

What is claimed is:

1. Apparatus for measuring the flow of a beam of electrically neutral particles in an evacuated environment having present therein a relatively large number of electrons and a relatively large amount of electromagnetic radiation, said apparatus comprising, in combination, sensing means positioned at a station in the path of a portion of the beam for sensing the flow thereof, shielding means disposed about said sensing means for providing a predetermined path for said portion of the beam to reach said sensing means so that particles other than those in said portion of the beam are prevented from reaching said sensing means and for shielding said sensing means from said electromagnetic radiation, stripping means disposed proximate to said portion of the beam prior to said beam portion reaching said station for producing a field for deflecting said electrons sufficiently to prevent them from reaching said sensing means, and means coupled to said sensing means for providing an indication of the flow of said beam sensed thereby.

2. The apparatus of claim 1 comprising means for collimating said portion of the beam prior to its reaching said sensing means and means disposed proximate said portion of the beam for intermittently blocking said beam portion prior to its reaching said sensing means so that the response of said sensing means to the collimated portion of the beam may be separated from any background response.

3. The apparatus of claim 1 wherein said shielding means comprises a housing generally enclosing said sensing means, said housing being electrically isolated from said sensing means so that the latter is unaffected by the exposure of the housing to said electrons and said electromagnetic radiation, said housing having a pair of openings therein aligned with the beam for collimating a portion thereof, and wherein said sensing means is positioned so as to be responsive to the collimated portion of the beam.

4. The apparatus of claim 3 wherein said stripping means comprises a pair of plates disposed on opposite sides of said portion of the beam, and further comprises a housing surrounding said plates and having a pair of openings therein in opposite walls which openings are aligned with said openings in said housing enclosing said sensing means, whereby a collimated portion of the beam passes between said plates prior to reaching said sensing means.

5. The apparatus of claim 4 wherein said sensing means comprises an ion gauge, and wherein means are disposed intermediate said housings for intermittently blocking the collimated portion of the beam prior to its reaching said sensing means, whereby the signal sensed by said sensing means due to the collimated portion of said beam may be separated from the signal sensed by said sensing means due to background particles.

6. The apparatus of claim 3 wherein a further stripping means is disposed proximate the one of said openings through which the beam leaves said housing subsequent to its reaching said sensing means.

7. The apparatus of claim 1 wherein said stripping means comprises a pair of plates disposed on opposite sides of said portion of the beam for producing an electrostatic field therebetween.

8. The apparatus of claim 1 comprising a further shielding means disposed about said stripping means, both of said shielding means comprising means for collimating the portion of the beam passing therethrough to said sensing means.

9. Apparatus for measuring the rate of deposition of a beam of ionizable vapor of substantially constant velocity on a substrate in an evacuated environment wherein the vapor is produced in a crucible by an electron gun, and wherein the crucible and electron gun produce electromagnetic radiation and charged particles in said environment, said apparatus including in combination, a housing having a pair of openings in opposite walls thereof for collimating a portion of the vapor, an ion gauge disposed in said housing in alignment with said openings for providing an indication of the flow of said ionizable vapor, means for supportng said housing in the vapor such that a portion thereof passes through said openings and such that a portion of said housing is disposed between said ion gauge and the electromagnetic radiation from the crucible and electron gun, means adapted to be positioned between said ion gauge and the crucible for interrupting the collimated portion of the vapor at a predetermined frequency prior to its reaching said ion gauge, an electronic circuit coupled to said ion gauge for producing an indication of the rate of vapor deposition from the flow sensed by said ion gauge and a stripper comprising a pair of electrode plates positioned to be on either side of the collimated portion of the vapor for producing an electrostatic field for deflecting said charged particles sufficiently to prevent such particles from traversing said ion gauge.

10. In a vacuum deposition system wherein a vapor beam is produced by a crucible of molten material and an electron gun, apparatus for controlling the flow of the beam, including in combination, a sensing device positioned to be in the path of a portion of the beam for sensing the flow thereof, a shield adjacent said sensing device for preventing particles other than those in said portion of said beam in which said sensing device is positioned from reaching said station and for shielding said sensing device from electromagnetic radiation produced by the crucible and electron gun, electronic means connected to said sensing device for producing an indication of the flow of said beam sensed by said sensing device, a feed-back circuit for coupling said electronic means to the electron gun to regulate the operation thereof and thereby control the flow of the vapor beam emitted from the molten material in the crucible, and a stripper positioned to be disposed proximate said beam prior to its reaching said sensing device and adapted to produce a magnetic or electrostatic field for deflecting charged particles to prevent such particles from reaching said sensing device.

11. The combination of claim 10 wherein said feedback circuit includes a differential amplifier coupled between said sensing element and the electron gun and wherein a source of reference potential is connected to said differential amplifier whereby the latter derives and amplifies error signals.

References Cited

UNITED STATES PATENTS

| | | | |
|---|---|---|---|
| 3,056,027 | 9/1962 | Martinelli | 250—83.6 |
| 3,136,908 | 6/1964 | Weinman | 313—63 |
| 3,168,418 | 2/1965 | Payne | 118—7 |
| 3,211,908 | 10/1965 | Leibowitz | 250—83.3 |

RALPH G. NILSON, *Primary Examiner.*

A. L. BIRCH, *Assistant Examiner.*

U.S. Cl. X.R.

118—7, 49.1, 49.5; 250—83.3, 83.6